United States Patent
Oishi et al.

(10) Patent No.: US 7,338,221 B2
(45) Date of Patent: Mar. 4, 2008

(54) SECTOR DRIVE MECHANISM (75) Inventors: Seiichi Oishi, Chiba (JP); Hiroyuki Mizukami, Chiba (JP); Hisashi Kawamoto, Chiba (JP); Takashi Nakano, Chiba (JP)

(73) Assignee: Seiko Precision Inc., Chiba (JP)

( * ) Notice: Subject to any disclaimer, the term of this patent is extended or adjusted under 35 U.S.C. 154(b) by 148 days.

(21) Appl. No.: 11/371,980

(22) Filed: Mar. 8, 2006

(65) Prior Publication Data
US 2006/0152093 A1 Jul. 13, 2006

Related U.S. Application Data (63) Continuation of application No. PCT/JP04/13151, filed on Sep. 9, 2004.

(30) Foreign Application Priority Data

Sep. 12, 2003 (JP) .............................. 2003-321823

(51) Int. Cl.
G03B 9/10 (2006.01)
G03B 9/18 (2006.01)

(52) U.S. Cl. ..................... 396/458; 396/463; 396/493; 396/501

(58) Field of Classification Search ................ 396/449, 396/452, 458, 460, 463, 493, 497, 501
See application file for complete search history.

(56) References Cited

U.S. PATENT DOCUMENTS 4,371,821 A * 2/1983 Laesser et al. .............. 318/696

5,040,017 A 8/1991 Arai

FOREIGN PATENT DOCUMENTS

| JP | 1264597 | 10/1989 |
|---|---|---|
| JP | 11018492 | 1/1990 |
| JP | 2087128 | 3/1990 |
| JP | 2089034 | 3/1990 |
| JP | 3122628 | 5/1991 |
| JP | 5027299 | 2/1993 |
| JP | 9015678 | 1/1997 |
| JP | 2001061268 | 3/2001 |
| JP | 2002062561 | 2/2002 |

OTHER PUBLICATIONS

International Search Report for PCT/JP2004/013151, dated Oct. 19, 2004.

* cited by examiner

*Primary Examiner*—W. B. Perkey
*Assistant Examiner*—Rishi Suthar
(74) *Attorney, Agent, or Firm*—Michaud-Duffy Group LLP (57) ABSTRACT

A sector drive mechanism includes an electromagnetic actuator including a rotor having four polarities, a C-shaped stator, and a current control portion that controls current applied to a first coil and a second coil, the C-shaped stator including a first magnetic pole magnetically excited by the first coil, a second magnetic pole magnetically excited by the second coil, and a third magnetic pole magnetically excited by the first coil and the second coil, and sectors that are connected to the electromagnetic actuator to open and close a shutter opening provided in a substrate. The first coil and the second coil are driven to close the shutter opening with a fewer number of pulses applied from the current control portion than the number of the pulses to open the shutter opening.

7 Claims, 11 Drawing Sheets

FULLY OPEN

FIG. 5

FULLY CLOSED

FIG. 6

SMALL APERTUE

FIG. 8

FULLY OPEN → FULLY CLOSED → FULLY OPEN

FIG. 9

SMALL APERTURE → FULLY CLOSED → SMALL APERTURE

FIG. 10

FULLY OPEN → (FULLY CLOSED) → SMALL APERTURE

FIG. 11

SMALL APERTURE → (FULLY CLOSED) → FULLY OPEN

SECTOR DRIVE MECHANISM

CROSS-REFERENCE TO RELATED APPLICATIONS

This application is a continuation of and claims priority to International Patent Application No. PCT/JP2004/013151 filed on Sep. 9, 2004, which claims priority to Japanese Patent Application No. 2003-321823 filed on Sep. 12, 2003, subject matter of these patent documents is incorporated by reference herein in its entirety.

BACKGROUND OF THE INVENTION

1. Field of the Invention

This invention generally relates to a sector drive mechanism, and more particularly, to a sector drive mechanism that can drive a sector efficiently by use of an electromagnetic actuator.

2. Description of the Related Art

In recent years, cameras have been computerized, and a sector is driven by use of an electromagnetic actuator. In this type of camera, it is desirable that the sector such as a shutter blade or aperture blade may be retained even when no current is applied. For instance, Japanese Patent Application Publication 2001-61268 (hereinafter, referred to as Patent Document 1) discloses the electromagnetic actuator having a magnetic member, which applies a locking force so that a rotor comes to a given position without swinging when the coil is not active. Such electromagnetic actuator enables the rotor to stop at an accurate position when the motor stops, and also enables to suppress the power consumption.

With respect to a sector drive apparatus for use in a camera, it is desirable that a drive portion such as the aperture blade or the shutter blade may be driven quickly, when necessary. For instance, Japanese Patent Application Publication 11-18492 (hereinafter, referred to as Patent Document 2) proposes a technique of driving the electromagnetic actuator quickly in a two-phase excitation method to a position near a final stopping position of an aperture open and close mechanism, and then driving in a one-two-phase excitation method for the remaining small portion to the final stopping position. With this proposal, it is possible to narrow the aperture to a given aperture value for a short period, reduce the time lag, and increase the accuracy of aperture value at the completion of aperture.

The electromagnetic actuator disclosed in the above-described Patent Document 1, however, has to additionally arrange a magnetic member so as to apply the locking force to the rotor. So, another member is added to the stator and a complex processing is implemented. This complicates the structure of the motor, resulting in a problem of increased production costs. The drive technique disclosed in the above-described Patent Document 2 proposes the technique for accurate position control, when the electromagnetic actuator is driven in the conventional and general two-phase excitation. Nevertheless, in the drive technique disclosed in Patent Document 2, the electromagnetic actuator is changed to the one-two-phase excitation method from the two-phase excitation method, while the aperture open and close mechanism is being driven. Therefore, there is the problem in that data creation and control systems are complicated and the costs are increased.

SUMMARY OF THE INVENTION

It is therefore an object of the present invention to address the above-described problems and provide a sector drive mechanism that can drive the sector accurately and efficiently.

The afore-described object can be achieved by a sector drive mechanism characterized by including: an electromagnetic actuator including a rotor having four polarities, a C-shaped stator, and a current control portion that controls current applied to a first coil and a second coil, the C-shaped stator including a first magnetic pole magnetically excited by the first coil, a second magnetic pole magnetically excited by the second coil, and a third magnetic pole magnetically excited by the first coil and the second coil; and sectors that are connected to the electromagnetic actuator to open and close a shutter opening provided in a substrate. The first coil and the second coil are driven to close the shutter opening with a fewer number of pulses applied from the current control portion than the number of the pulses to open the shutter opening.

In accordance with the present invention, when the sectors close the shutter opening that needs a shutter speed, the number of the drive pulses supplied from the current control portion is reduced to drive the sectors efficiently. Accordingly, the camera having the present sector drive mechanism is capable of obtaining an image having excellent quality.

Preferably, the sector drive mechanism includes a movement regulation member that regulates the sectors to given positions in a state where the shutter opening is opened, wherein a magnetic pole of the rotor is misaligned from a position that faces the magnetic pole of the stator in the state where the shutter opening is opened. With this configuration, it is possible to rotate the rotor from the misaligned position as a base point. With a fewer number of the drive pulses, the sectors can be moved to close the shutter opening.

In the sector drive mechanism, the state where the shutter opening may be opened includes a fully open state where all the sectors having at least one shutter blade and at least one aperture blade open the shutter opening, and a small aperture state where the afore-mentioned at least one aperture blade comes to the position of the shutter opening.

Preferably, in the sector drive mechanism, the current control portion supplies a single drive pulse to close the shutter opening, and supplies multiple drive pulses to open the shutter opening. With this configuration, a single drive pulse moves the sectors in one step, thereby enabling to speed up the shutter speed most.

It is preferable that in the sector drive mechanism, the multiple drive pulses supplied from the current control portion to open the shutter opening include a direction control pulse that determines a rotational direction of the rotor. With this configuration, the rotor in a the fully closed position can to moved in a desired direction certainly to make the shutter opening in a fully open state or in a small aperture state.

The current control portion may include a brake pulse in the single drive pulse to close the shutter opening. Similarly, in the sector drive mechanism, the current control portion may include a holding pulse before the multiple drive pulses to open the shutter opening.

In accordance with the present invention, the current control portion efficiently drives the coils to close the sectors, when the shutter speed is required.

DESCRIPTION OF THE PREFERRED EMBODIMENTS

A description will now be given, with reference to the accompanying drawings, of an embodiment of a sector drive mechanism in accordance with the present invention. Hereinafter, a preferred electromagnetic actuator employed for the sector drive mechanism will be described at first, and subsequently the whole configuration and operation of the sector drive mechanism will be described.

Figure 1:
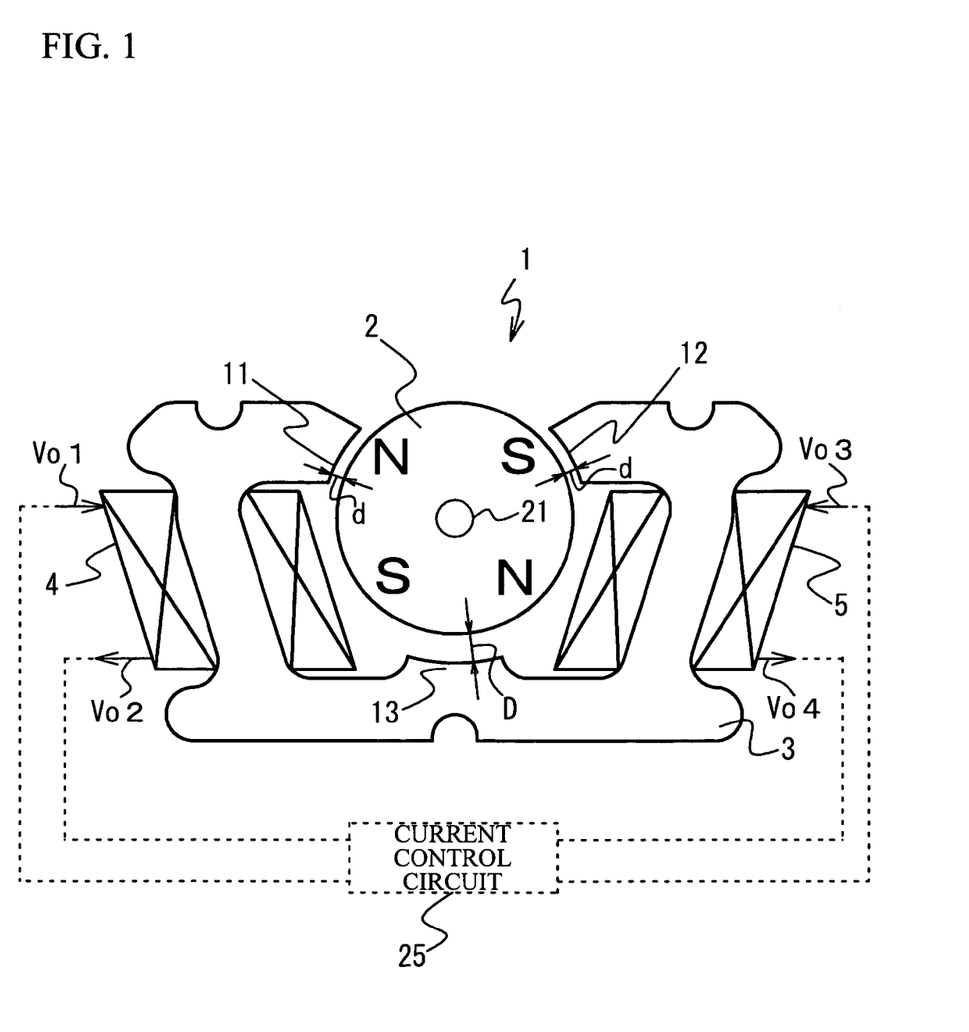
FIG. 1 is a view showing main components of an electromagnetic actuator employed for the sector drive mechanism in accordance with an embodiment of the present invention.

FIG. 1 is a view showing main components of an electromagnetic actuator 1 employed for the sector drive mechanism in accordance with an embodiment of the present invention. The electromagnetic actuator 1 includes a rotor 2 and a stator 3. The rotor 2 is arranged in the center of the electromagnetic actuator 1, and is capable of rotate in both directions. The stator 3 is arranged outside the rotor 2 to face the outer surface of the rotor 2. The rotor 2 has a cylindrical shape, and has a circular shape at cross section. The stator 3 has a C-shaped planar shape, and is integrally formed. The rotor 2 is arranged in a space, which is largely surrounded by the stator 3.

Here, C-shaped denotes not only the shape that looks like a character of C but also a closed shape such as a circle, ellipse, or polygon, having one portion split and opened. Therefore, the stator 3 shown in FIG. 1 has a shape in which one side in a quadrangle is partially cut out. The electromagnetic actuator 1 is shown in FIG. 1 in such a manner that the opened side of the stator 3, namely, ends are arranged on the upper side thereof.

The rotor 2 has four magnetic poles that include two North magnetic poles and two South magnetic poles. The rotor 2 is a permanent magnet which is magnetized in such a manner that identical polarities are positioned to face each other and are rotatably provided in both directions about the rotation axis 21. The both ends having the afore-described C-shape are formed to face the outer surface of the rotor 2. The ends respectively serve as a first magnetic pole 11 and a second magnetic pole 12. A third magnetic pole 13 is arranged in an intermediate position between the first magnetic pole 11 and the second magnetic pole 12.

A first coil 4 is wound between the first magnetic pole 11 and the third magnetic pole 13, and a second coil 5 is wound between the second magnetic pole 12 and the third magnetic pole 13. The first magnetic pole 11 is magnetically excited when the first coil 4 is energized, and the second magnetic pole 12 is magnetically excited when the second coil 5 is energized. On the other hand, the third magnetic pole 13 is magnetically excited by both the first coil 4 and the second coil 5. Accordingly, the state of the third magnetic pole 13 appears as a combination of the energized state of the first coil 4 and that of the second coil 5.

In the electromagnetic actuator 1, a current control circuit 25 that serves as a current control portion is connected to the first coil 4 and the second coil 5. Pulsing current (drive pulse) is applied to the first coil 4 and the second coil 5 from the current control circuit 25 to control them. As shown, a current Vo1 having a given waveform is applied to the first coil 4 from the current control circuit 25, and a current Vo2 having a symmetric waveform thereof is output. Similarly, a current Vo3 having a given waveform is applied to the second coil 5 from the current control circuit 25, and a current Vo4 having a symmetric waveform thereof is output. As will be described later, the drive pulse is supplied to the first coil 4 and the second coil 5 from the current control circuit 25 to drive the electromagnetic actuator 1 to rotate. Then, the sectors connected to the electromagnetic actuator 1 are driven for stepping drive.

It is possible to control to drive the rotor 2 to rotate by changing the directions of the current supplied to both the coils 4 and 5 from the current control circuit 25, as necessary, to change the magnetic fields. It is possible to form the state where the first magnetic pole 11 and the second magnetic pole 12 are magnetically excited to have an identical polarity and different polarities. At this time, if the first magnetic pole 11 and the second magnetic pole 12 are magnetically excited to an identical polarity, the third magnetic pole 13 has the magnetic field greater than them. In contrast, if the first magnetic pole 11 and the second magnetic pole 12 are magnetically excited to different polarities, the magnetization is cancelled in the third magnetic pole 13, resulting in a non-magnetized state. The rotation of the rotor 2 will be described later in detail, with reference to drawings.

In the electromagnetic actuator 1, the rotor 2 has four magnetic poles, and has a structure in which a sufficient detent torque is obtainable, in particular, in a non-energized state where neither the first coil 4 nor the second coil 5 is energized. In the electromagnetic actuator 1, a distance between the circumferential surface and the first magnetic pole 11 is identical to the distance between the circumferential surface and the second magnetic pole 12, the distance being set to a gap d. The gap d is configured narrow enough o obtain a sufficient magnetic attraction between the rotor 2 and the magnetic poles. On the other hand, a gap D, which is a distance between the circumferential surface and the third magnetic pole 13, is configured greater than the gap d. The gap D is configured to have a distance in such a manner that the magnetic attraction generated between the third magnetic pole 13 and the rotor 2 equals to that generated between the first magnetic pole 11 and the second magnetic pole 12 and the rotor 2. For example, the gap D is configured approximately 1.3 times as far as the gap d.

The above-described configuration realizes the structure in which the magnetic relationships with the rotor 2 are almost equal among the first magnetic pole 11, the second magnetic pole 12, and the third magnetic pole 13. Therefore, in the non-energized state, as shown in FIG. 1, two magnetic poles on the rotor 2 are stable on the positions that respectively face the first magnetic pole 11 and the second magnetic pole 12. The electromagnetic actuator 1 has three positions where the magnetic attraction exists in the non-energized state, making it possible to obtain an intense detent torque. It is therefore possible to retain the rotor stably at a given position in the non-energized state.

Also, referring to FIG. 2, the rotation of the rotor 2 in the electromagnetic actuator 1 is described. In the electromagnetic actuator 1, the rotor 2 is rotated in the two-phase excitation that magnetically excites the first coil 4 and the second coil 5. Current is supplied to the coils 4 and 5 from the current control circuit 25, shown in FIG. 1, yet this is not shown in the drawings.

Figure 2A:
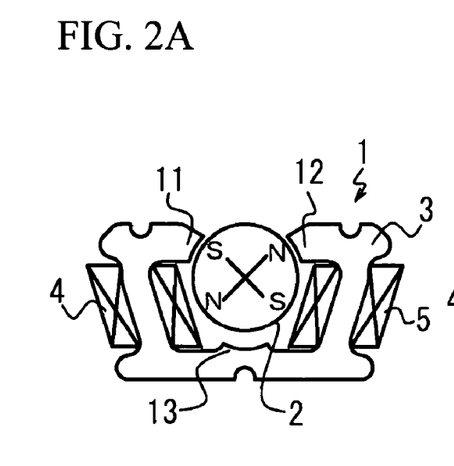
FIG. 2A through FIG. 2E show a case where a first coil and a second coil are magnetically excited to rotate a rotor clockwise (turn in a right direction) at a stepping angle of 45°.

FIG. 2A through FIG. 2E show a case where the first coil 4 and the second coil 5 are magnetically excited to rotate the rotor 2 clockwise (turn in a right direction) at a stepping angle of 45°. FIG. 2A shows the coils 4 and 5 to which no current is applied. FIG. 2B through FIG. 2E show a case where the current supplied to the coils 4 and 5 is controlled to rotate the rotor 2 clockwise in a time-series manner. FIG. 2A shows the non-magnetized state where the coils 4 and 5 are not energized and neither the first magnetic pole 11, the second magnetic poles 12, nor the third magnetic pole 13 is magnetically excited. However, as described above, the South magnetic pole and the North magnetic pole of the rotor 2 are respectively retained on the positions that face the first magnetic pole 11 and the second magnetic pole 12.

Figure 2B:
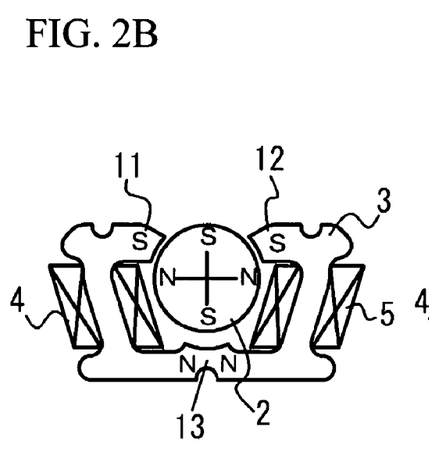
Figure 2C:
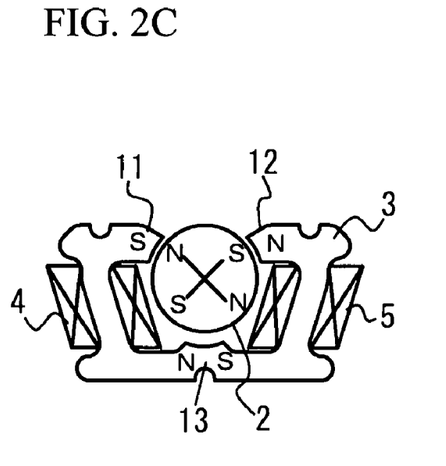
Figure 2D:
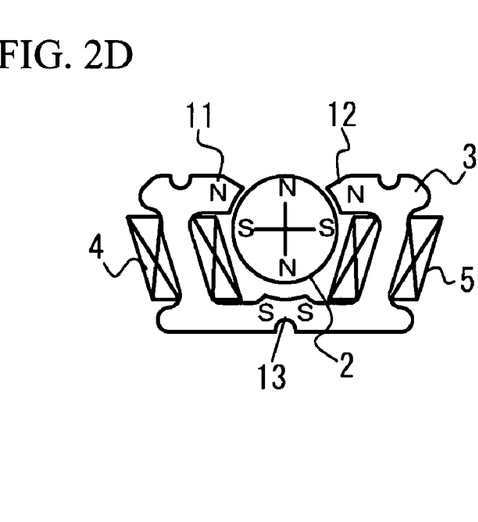

FIG. 2B shows a case where the first coil 4 and the second coil 5 are energized from the state shown in FIG. 2A, and both the first magnetic pole 11 and the second magnetic pole 12 are magnetically excited to the South magnetic poles. In the state shown in FIG. 2B, the magnetic excitation is doubled in the third magnetic pole 13, which serves as the North magnetic pole. Therefore, the state shown in FIG. 2A is certainly shifted to the state shown in FIG. 2B. FIG. 2C shows a case where the excitation state of the first magnetic pole 11 is retained as the South magnetic pole and that of the second magnetic pole 12 is retained as opposite, namely, the North magnetic pole. At this time, the North magnetic pole and the South magnetic pole are magnetically excited in the third magnetic pole 13 and are cancelled each other, resulting in the non-magnetized state. Similarly, FIG. 2D shows a case where both the first magnetic pole 11 and the second magnetic pole 12 are magnetically excited to the North magnetic pole from the state shown in FIG. 2C. FIG. 2D shows a reverse state from that shown in FIG. 2B. The magnetic excitation is doubled in the third magnetic pole 13, which serves as the South magnetic pole. Therefore, the state shown in FIG. 2C is certainly shifted to that shown in FIG. 2D.

Figure 2E:
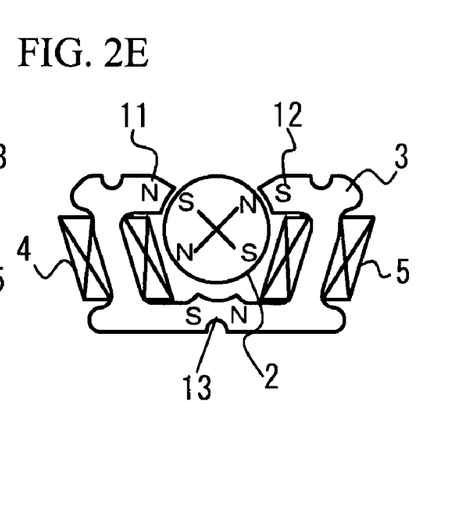

Next, FIG. 2E shows a case where the excitation state of the first magnetic pole 11 is retained as the North magnetic pole, and the second magnetic pole 12 is magnetically excited to be opposite, namely, the South magnetic pole. At this time, the North magnetic pole and the South magnetic pole are magnetically excited in the third magnetic pole 13 and are cancelled each other, resulting in the non-magnetized state. In FIG. 2, as is obvious from the above description, the poles of the rotor are positioned to face the magnetic poles 11 and 12 on the stator 3 in FIG. 2A, FIG. 2C, and FIG. 2E. The states shown in FIG. 2B and FIG. 2D, which are neutral states, exist between them. In FIG. 2B and FIG. 2D, the magnitude of magnetization is doubled in the third magnetic pole 13. Accordingly, it is possible to shift to the states shown in FIG. 2B and FIG. 2D from the previous states, thereby enabling to carry out a smooth rotation from FIG. 2A through FIG. 2E.

As described, the rotor 2 rotates clockwise by 45°, as shown, as the magnetized states of the first through third magnetic poles 11 through 13 on the stator 3 sequentially change. The respective drawings in FIG. 2A through FIG. 2E show the rotor 2 when the first coil 4 and the second coil 5 are energized and the rotor comes to the positions where the rotation of 45° is completed. One of noteworthy points in FIG. 2A through FIG. 2E is FIG. 2A that shows the non-energized state. In the electromagnetic actuator 1, the gap d between the rotor 2 and the first magnetic pole 11 and between the rotor 2 and the second magnetic pole 12 is formed narrow, and an intense magnetic attraction is generated between the rotor 2 and the first magnetic pole 11 and between the rotor 2 and the second magnetic pole 12. Accordingly, the state shown in FIG. 2A can be retained surely by the detent torque even when current is not applied.

In addition, in the states shown in FIG. 2C and FIG. 2E, the first magnetic pole 11 and the second magnetic pole 12 are magnetically excited, yet the two magnetic fields on the rotor 2 respectively face the first magnetic pole 11 and the second magnetic pole 12. Even if the current applied to the coils 4 and 5 is stopped, it is possible to retain the state with the detent torque, as in the case shown in FIG. 2A. The position of the rotor 2 in FIG. 2E is same as that shown in FIG. 2A. Therefore, if the current applied to the coils 4 and 5 is stopped in the state shown in FIG. 2E, which results in the state shown in FIG. 2A. As described heretofore, the electromagnetic actuator 1 has an excellent configuration that the power consumption can be suppressed due to the intense detent torque when no current is applied to the coil 4 or 5.

Figure 3A:
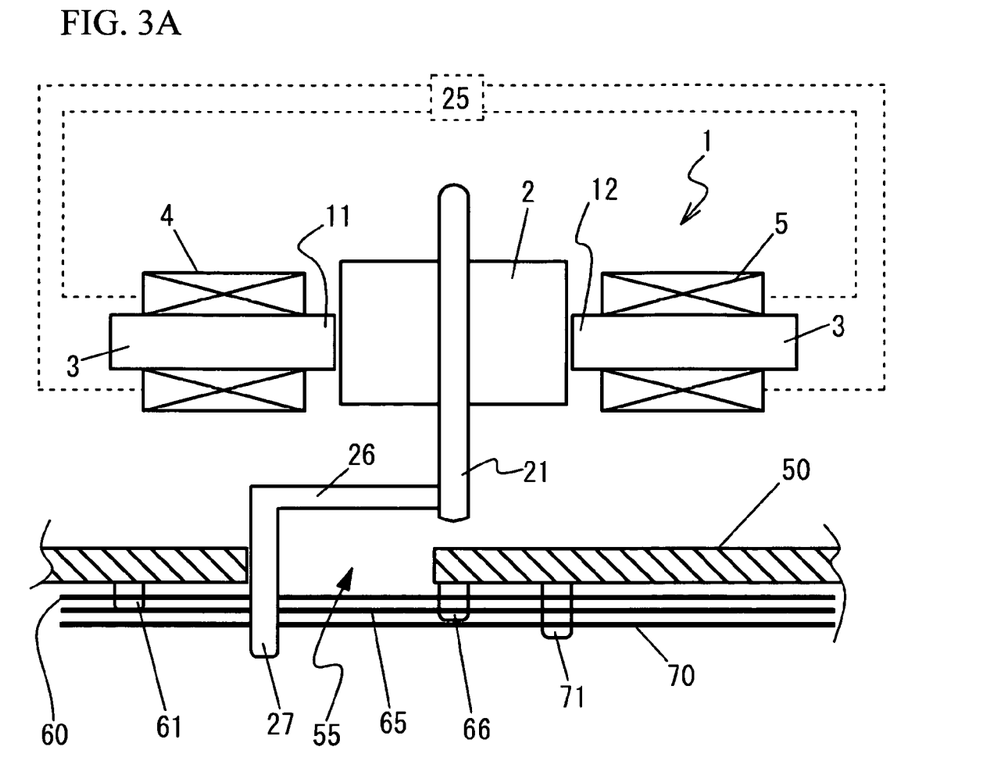
FIG. 3A is a plan view schematically showing the electromagnetic actuator arranged together with a shutter substrate.

Further, with reference to FIG. 3A through FIG. 6 hereinafter, a description will be given of an embodiment of a drive mechanism in which the above-described electromagnetic actuator 1 is employed for a sector drive portion of a camera. FIG. 3A is a plan view schematically showing the electromagnetic actuator 1 arranged together with a shutter substrate 50. The shutter substrate 50 has a shutter opening 51 for image capturing, as will be described later. Three sectors 60, 65, and 70 are provided along the substrate surface. These sectors are a first shutter blade 60, a second shutter blade 65, and an aperture blade 70, from the side of the shutter substrate 50. The above-described electromagnetic actuator 1 is positioned on the back side of the shutter substrate 50.

The openings cannot be confirmed in FIG. 3A, however, the first shutter blade 60 includes two openings: one is engaged with a protrusion 61 provided in the substrate 50 and the other is engaged with an engagement pin 27 that extends from the rotor 2. Similarly, the second shutter blade 65 includes two openings: one is fit with a protrusion 66 provided in the substrate 50 and the other is engaged with the engagement pin 27 that extends from the rotor 2. Also, the aperture blade 70 includes two openings: one is engaged with a protrusion 71 provided in the substrate 50 and the other is engaged with the engagement pin 27 that extends from the rotor 2. The first shutter blade 60, the second shutter blade 65, and the aperture blade 70 respectively swing in trajectories, in accordance with the movement of the engagement pin 27, as will be described later. The positions of the afore-mentioned openings provided in the blades 60, 65, and 70 and the movements thereof will be shown in FIG. 4 through FIG. 6.

An arm portion 26 that extends in a radial direction is connected to a rotor axis 21 provided on the back side of the substrate 50 in the electromagnetic actuator 1. The engagement pin 27 is connected to an end of the arm portion 26, and extends to an opposite side of the shutter substrate 50 through an opening 55 provided in the shutter substrate 50. The openings respectively provided in the first shutter blade 60, the second shutter blade 65, and the aperture blade 70 are engaged with the engagement pin 27 that extends to the front side. Accordingly, when the rotor 2 in the electromagnetic actuator 1 rotates, the engagement pin 27 rotates in accordance with the rotation thereof and the first shutter blade 60, the second shutter blade 65, and the aperture blade 70 swing in given trajectories.

Figure 3B:
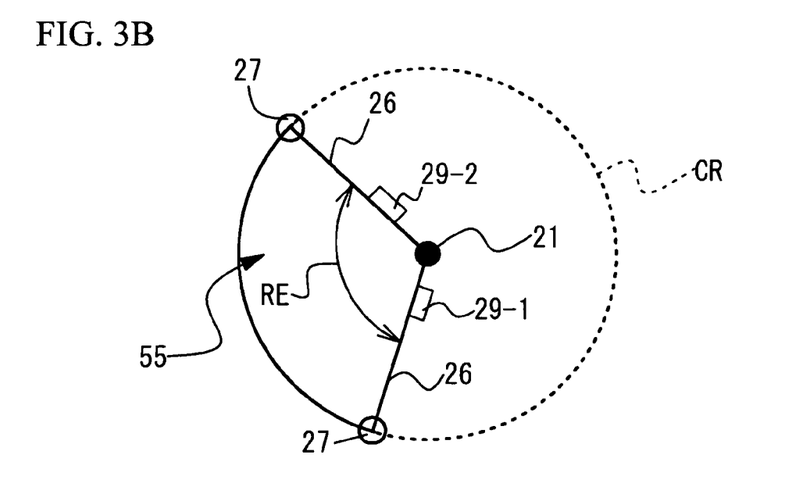
FIG. 3B shows a moving trajectory of an engagement pin.

FIG. 3B shows a moving trajectory CR of the engagement pin 27. The engagement pin 27 is capable of rotating at 360° according to the rotation of the rotor 2. However, the opening 55 formed in the substrate 50 has a fan shape and a member 29 that regulates the movement of the arm 26 is provided. When the arm 26 comes into contact with the regulation member 29, the rotation of the rotor 2 is restricted. The movement of the engagement pin 27 connected to the arm 26 is also regulated. As a result, the sectors 60, 65, and 70 to be driven by the engagement pin 27 are also regulated to given positions. Accordingly, the regulation member 29 fulfills the function that regulates the sectors to given positions. One regulation member 29 is respectively provided on both sides that establish a rotation range of the arm 26. The arm 26 gets into contact with a first regulation member 29-1 when the sector is in a fully open state, and gets into contact with a second regulation member 29-2 when the sector is in a small aperture state. Here, in accordance with the present embodiment, the engagement pin 27 is so configured to rotate within a given range RE. The range RE is set to a center angle of approximately 120°. FIG. 3A and FIG. 3B do not show a gear that adjusts a drive ratio of the axis 21 and the arm 26, yet there is the gear existent between the axis 21 and the arm 26, so that the rotation range of the rotor 2 shown in FIG. 2A through FIG. 2E is adjusted to the afore-mentioned range RE.

Figure 4:
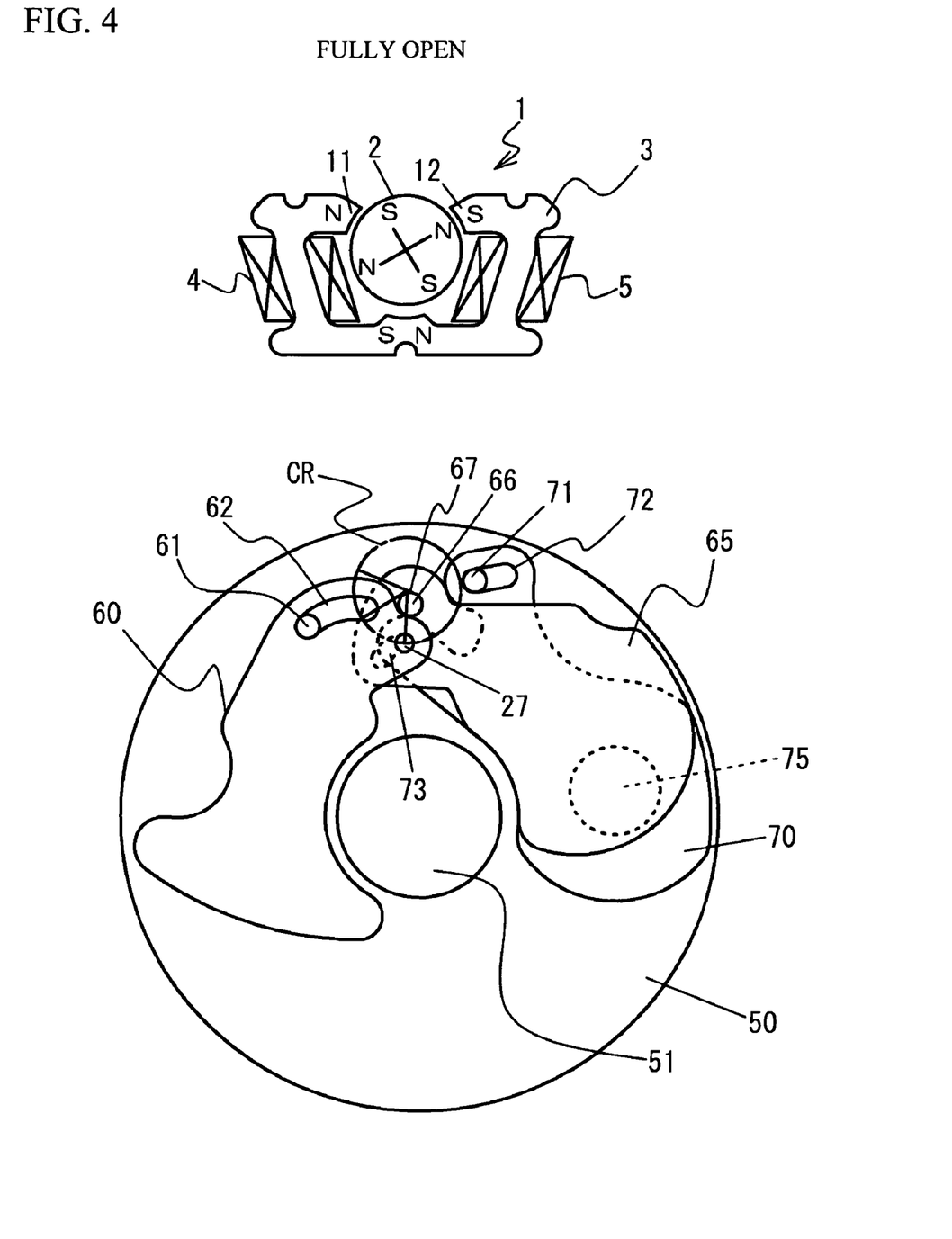
FIG. 4 shows a shutter opening for image capturing provided in the substrate in a fully open state.
Figure 5:
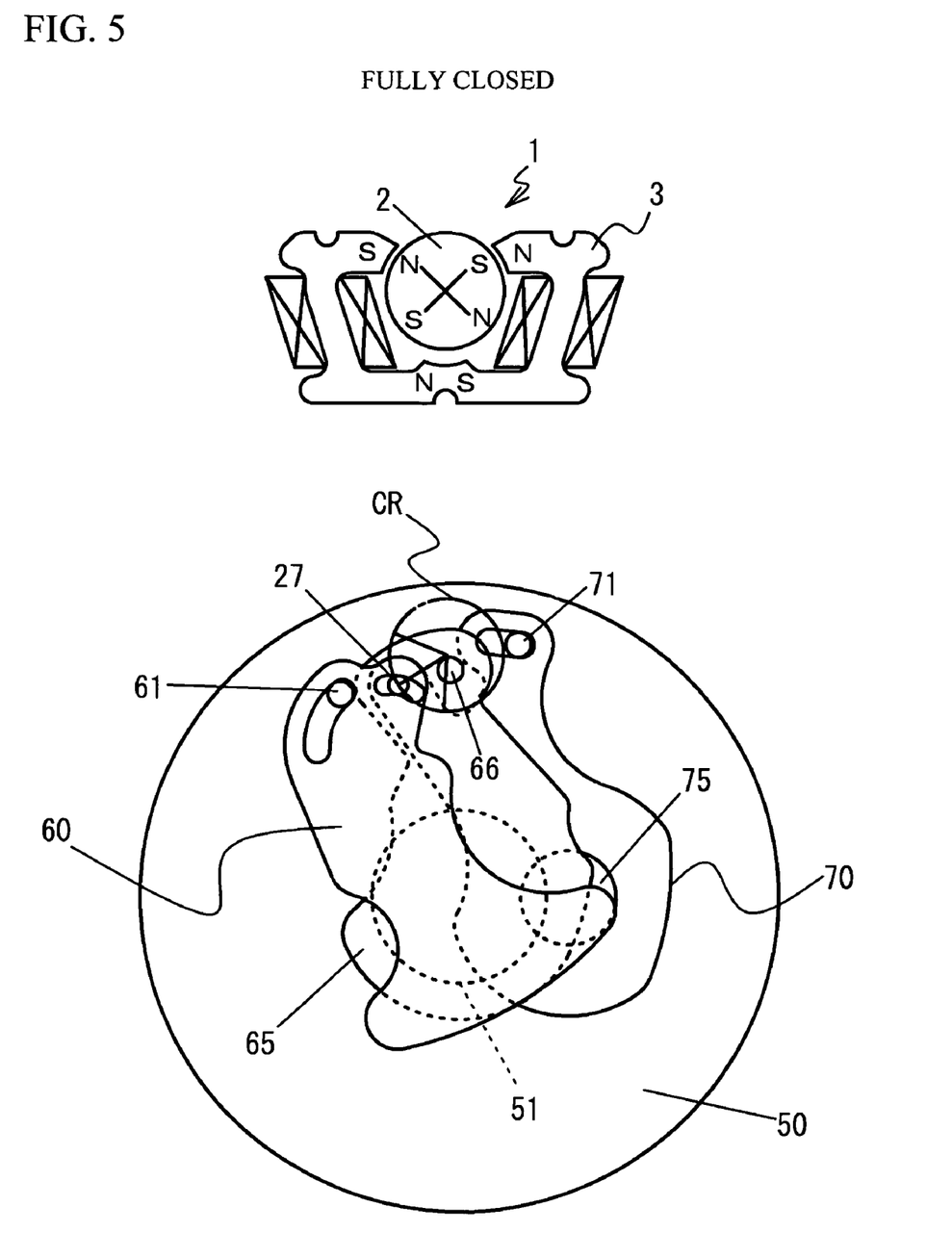
FIG. 5 shows the shutter opening for image capturing provided in the substrate in a fully closed state.
Figure 6:
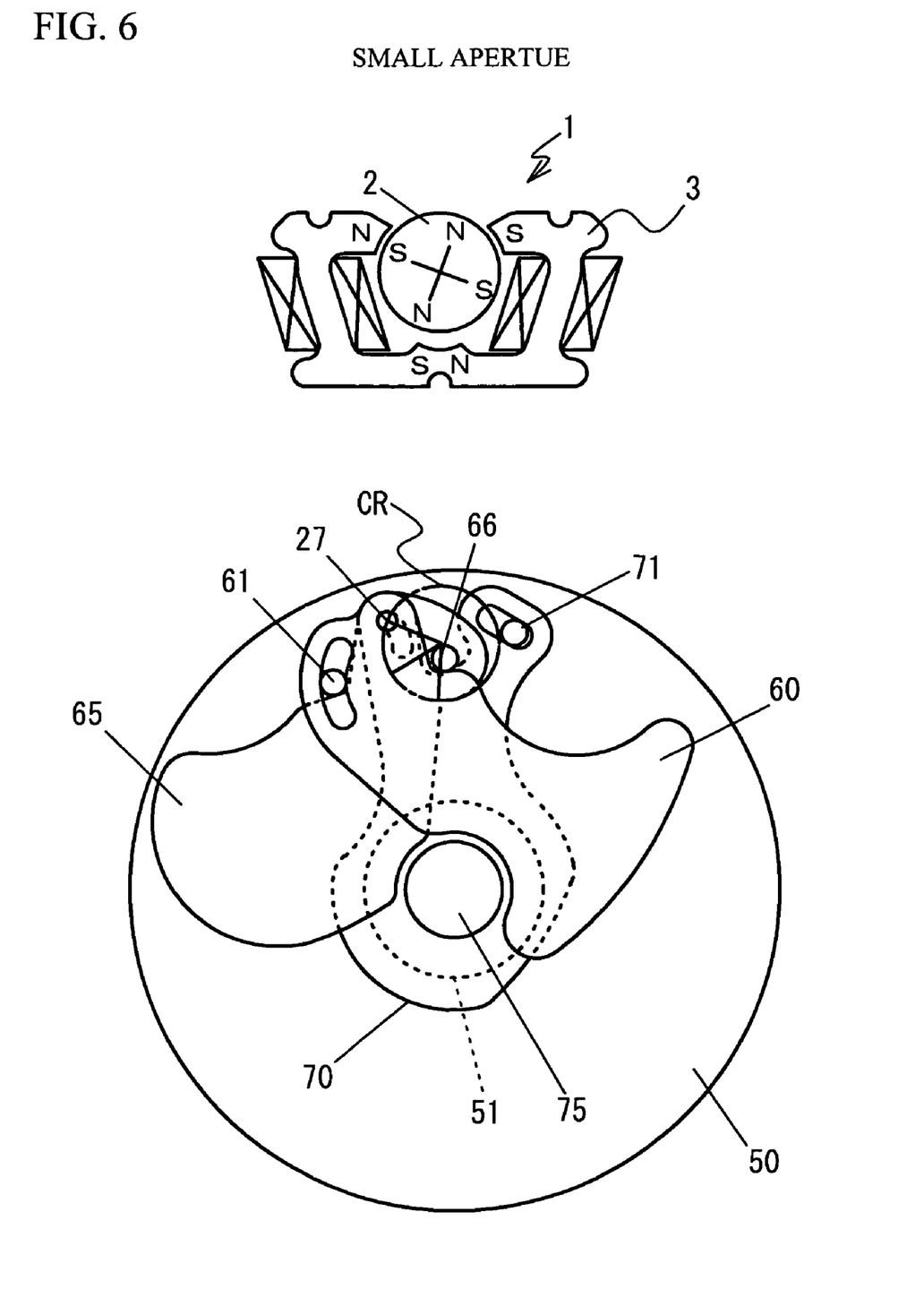
FIG. 6 is a view showing a small aperture state where an aperture blade is positioned on the shutter opening for image capturing in the substrate.
Figure 7A:
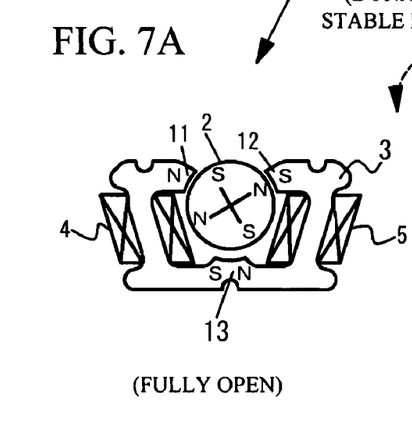
FIG. 7A through FIG. 7E show the electromagnetic actuator so that the rotation state of the rotor can be confirmed when the sectors form the fully open state, fully closed state, and small aperture state.
Figure 7B:
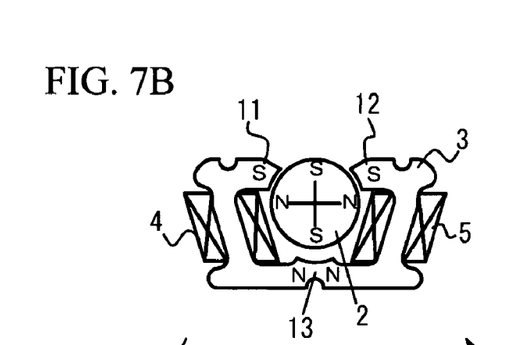
Figure 7C:
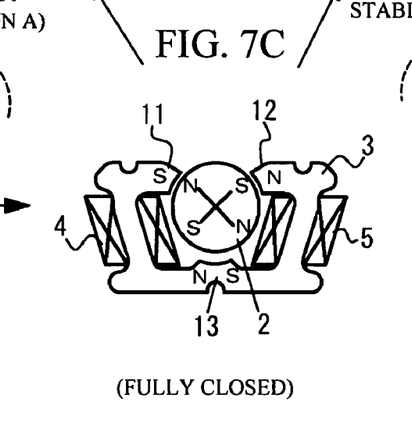
Figure 7D:
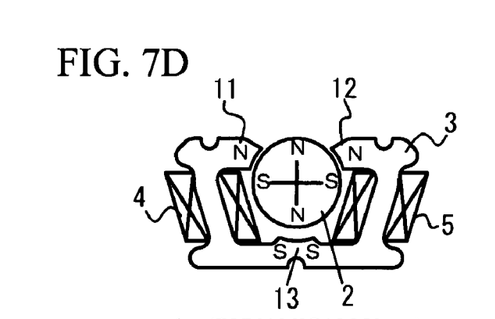
Figure 7E:
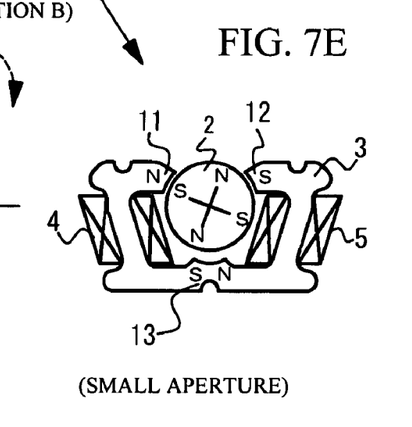

The operation of the sector drive mechanism having the above-described configuration is described, with reference to FIG. 4 through FIG. 6. Those drawings show changes in positions of the first shutter blade 60, the second shutter blade 65, and the aperture blade 70, when viewed from the front surface side of the shutter substrate 50. On the upper sides of those drawings, the electromagnetic actuator 1 is shown so that the rotation state of the rotor 2 can be confirmed.

FIG. 4 shows the shutter opening 51 for image capturing provided in the substrate 50 in a fully open state. At this time, the rotor 2 of the electromagnetic actuator 1 has a rotation angle of 0° (which corresponds to a position shown in FIG. 2A). However, actually, the position of the rotor 2 slightly shifts toward the position shown in FIG. 2B from that shown in FIG. 2A. That is to say, the magnetic poles of the rotor 2 are shifted in a right-handed direction (clockwise) from the position where the rotor 2 faces the magnetic poles of the stator 3. This is because the rotor 2 gets into contact with the regulation member 29-1 and is stopped. At this time, the detent torque makes the South magnetic pole and the North magnetic pole respectively move to the positions that face the first magnetic pole 11 and the second magnetic pole 12, yet are regulated by the regulation member 29. Thus, it is possible to retain the state of the sector, even if the coils 4 and 5 are not energized in the state shown in FIG. 4. FIG. 4 shows an opening 62 in the first shutter blade 60 engaged with the protrusion 61, an opening 67 in the second shutter blade 65 fit with the protrusion 66, and an opening 72 in the aperture blade 70 engaged with the protrusion 71. With respect to the engagement opening engaged with the engagement pin 27, an engagement opening 73 in the aperture blade 70 can be confirmed.

FIG. 5 shows the shutter opening 51 for image capturing provided in the substrate 50 in a fully closed state. FIG. 5 shows a state where the rotor 2 has rotated by 65° in a clockwise direction from the state shown in FIG. 4. The engagement pin 27 rotates in conjunction with this movement. The first shutter blade 60, the second shutter blade 65, and the aperture blade 70 swing in given trajectories in accordance with the rotation of the engagement pin 27, and the shutter opening 51 is closed by the first shutter blade 60 and the second shutter blade 65. The rotor 2 in the electromagnetic actuator 1 rotates in a clockwise direction, and corresponds to the state shown in FIG. 2C. In FIG. 5, the North magnetic pole and the South magnetic pole of the rotor 2 are respectively retained on the positions that face the first magnetic pole 11 and the second magnetic pole 12 by the detent torque. Accordingly, even if the current flowing across the coils 4 and 5 is stopped in the state shown in FIG. 5, it is possible to retain the sectors in the closed state. The retention is great enough to retain the state surely, even if some impact is applied to the camera.

FIG. 6 is a view showing the small aperture state where the aperture blade is positioned on the shutter opening 51 for image capturing in the substrate 50. FIG. 6 shows a state where the rotor 2 further rotates clockwise from the state shown in FIG. 5. The engagement pin 27 rotates in conjunction with this movement. The first shutter blade 60, the second shutter blade 65, and the aperture blade 70 swing in given trajectories in accordance with the rotation of the engagement pin 27, and the first shutter blade 60 and the second shutter blade 65 move away to the positions that open the shutter opening 51. Instead, the aperture blade 70 moves to the position that covers the shutter opening 51. The aperture blade 70 includes an aperture opening 75, and realizes the state of the shutter opening 51 in a small aperture state. At this time, the rotor 2 in the electromagnetic actuator 1 rotates clockwise and moves to, for example, the position slightly closer to the position shown in FIG. 2D. This position is misaligned so that the rotor 2 is brought into contact with the regulation member 29 and stopped as in the state shown in FIG. 4. However, in this case, the rotor 2 is brought into contact with the regulation member 29-2 provided on the opposite side, and therefore, the rotor 2 is slightly shifted to a counterclockwise direction, which is opposite from the state shown in FIG. 4. Also in the state shown in FIG. 6, even if current being applied to the coils 4 and 5 is stopped, it is possible to retain the positions of the sectors, thereby enabling to retain the small aperture state.

Here, a description is given with reference to FIG. 7A through FIG. 7E. FIG. 7A through FIG. 7E show the electromagnetic actuator 1 so that the rotation state of the rotor 2 can be confirmed when the sectors 60, 65, and 70 form the fully open state, fully closed state, and small aperture state. FIG. 7A through FIG. 7E respectively correspond to FIG. 2A through FIG. 2E. The fully open state and the small aperture state respectively correspond to FIG. 2A and FIG. 2E, yet since the above-described electromagnetic actuator 1 is incorporated on the sector drive mechanism, the position of the rotor 2 is misaligned by the regulation member 29 (see FIG. 3B).

The sector drive mechanism is configured to improve the shutter speed by utilizing the misalignment that is generated when the fully open state and the small aperture state are formed as described above. Hereinafter, this point is described. As shown in FIG. 7A through FIG. 7E, the position of the rotor 2 is shifted counterclockwise in the small aperture state. Therefore, one-step drive that applies a single drive pulse to the coils 4 and 5 realizes the fully closed state. Similarly, the position of the rotor 2 is shifted clockwise in the fully open state. Therefore, one-step drive that applies a single drive pulse to the coils 4 and 5 realizes the fully closed state.

However, when the state is changed to the fully open state or the small aperture state from the fully closed state, which is different from the afore-described state. As shown in FIG. 7A through FIG. 7E, in the fully closed state, the magnetic poles on the rotor 2 accurately face the magnetic poles 11 and 12 on the stator 3. Therefore, even if the magnetic flux is applied to the rotor in this position from the coils 4 and 5, it is uncertain whether the rotor moves to the fully open state or the small aperture state. Hence, the sector drive mechanism is configured in such a manner that the fully closed state is changed to the fully open state through a dynamically stable position A and the fully closed state is changed to the small aperture state through a dynamically stable position B. The stopped state on the afore-described dynamically stable positions allows to determine to which side the rotor 2 should be rotated, to the fully open state or the small aperture state from the fully closed state.

Here, the stopped states on the afore-described dynamically stable positions corresponds to FIG. 2B and FIG. 2D, where the magnetization is doubled on the third magnetic pole 13. The rotor 2 certainly rotates to the neutral position from the fully closed state. Subsequently, it is possible to rotate the rotor 2 smoothly to the fully open state from the neutral state A or to the small aperture state from the neutral state B.

The electromagnetic actuator 1 shown in FIG. 7A through FIG. 7E is driven by the current (drive pulse) supplied to the coils 4 and 5 from the current control circuit 25. Accordingly, in order to change the state to the fully closed state from the fully open state or the small aperture state, a single drive pulse is supplied to the coils 4 and 5 from the current control circuit 25. When the state is changed to the fully open state or the small aperture state from the fully closed state, the drive pulse (direction control pulse) that shifts to the dynamically stable stopped state A or B is supplied for determining the rotational direction at first. Then, another drive pulse that shifts to the fully open state or the small aperture state from the dynamically stopped state A or B.

As is obvious from the description heretofore, the sector drive mechanism employs the electromagnetic actuator 1. In order to change the state to the fully closed state from the fully open state or the small aperture sate, a single drive pulse is supplied from the current control circuit 25 to form the fully closed state in one step. Accordingly, it is possible to close the shutter opening rapidly. On the other hand, in order to change the state to the fully open state or the small aperture state from the fully closed state, the speed is not needed as compared to the case where the opening is closed. Consequently, the control pulse is supplied to determine the rotational direction that shifts to the dynamically stable stopped state A or B is supplied from the current control circuit 25 to determine the rotational direction. Subsequently, a drive pulse is supplied to form the fully open state or the small aperture state. That is to say, the fully open state or the small aperture state is surely achieved from the fully closed state in multiple steps.

Figure 8:
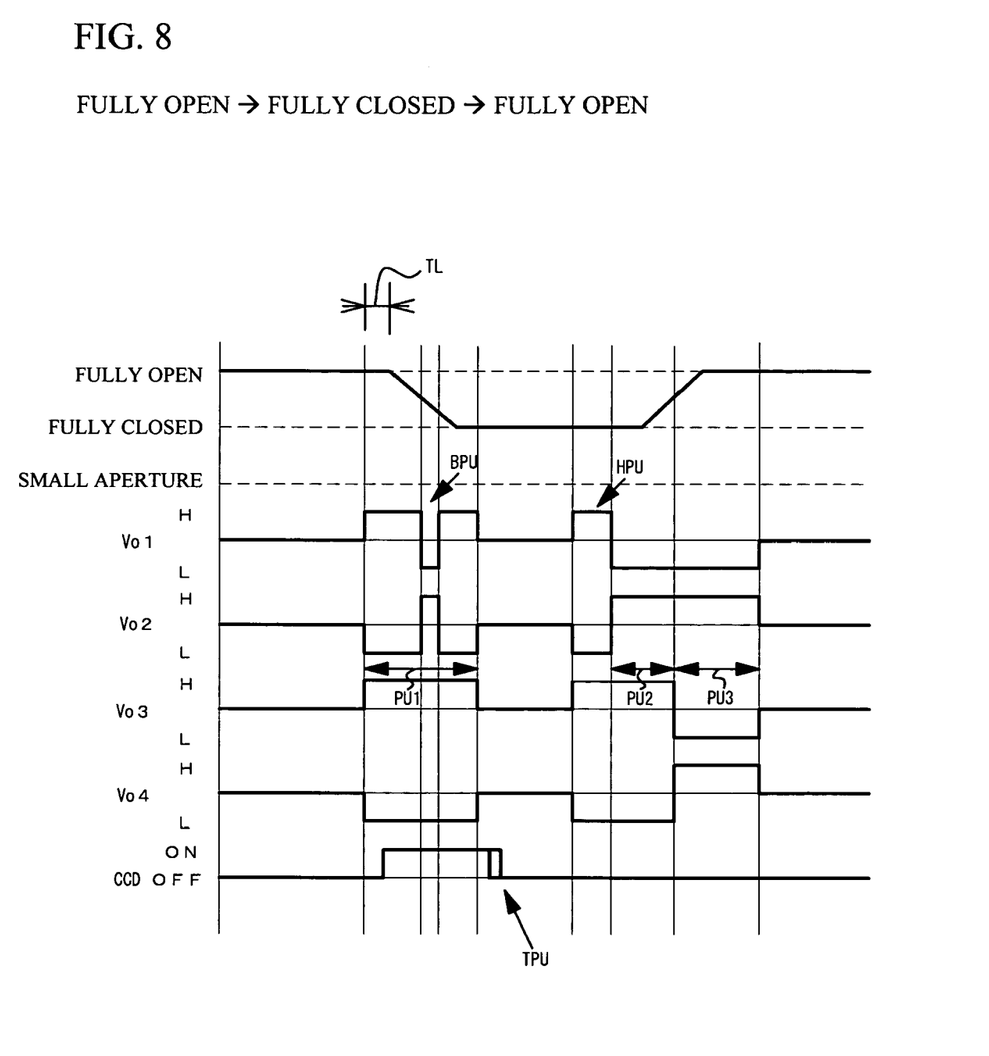
FIG. 8 shows a timing chart where the state is changed to the fully closed state from the fully open state and then that state is changed back to the fully open state again.
Figure 9:
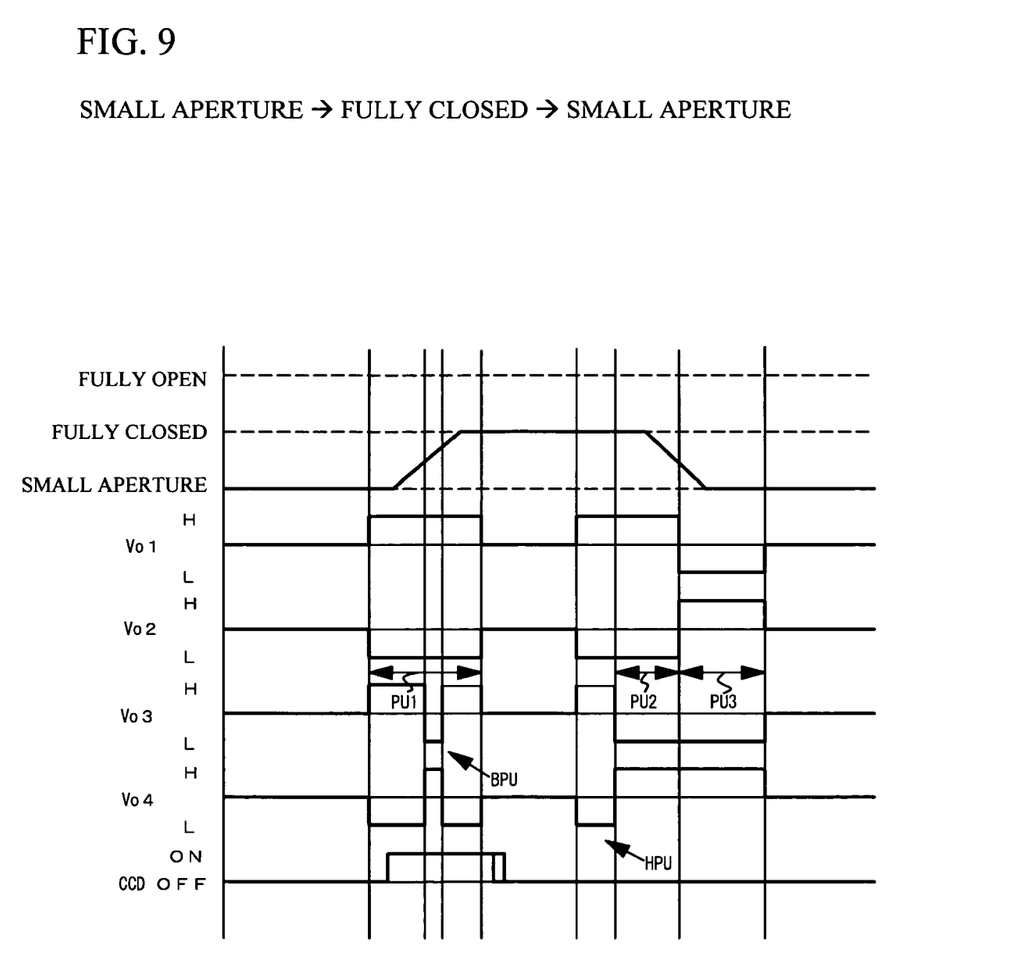
FIG. 9 shows a timing chart where the state is changed to the fully closed state from the small aperture state and then that state is changed back to the small aperture state again.
Figure 10:
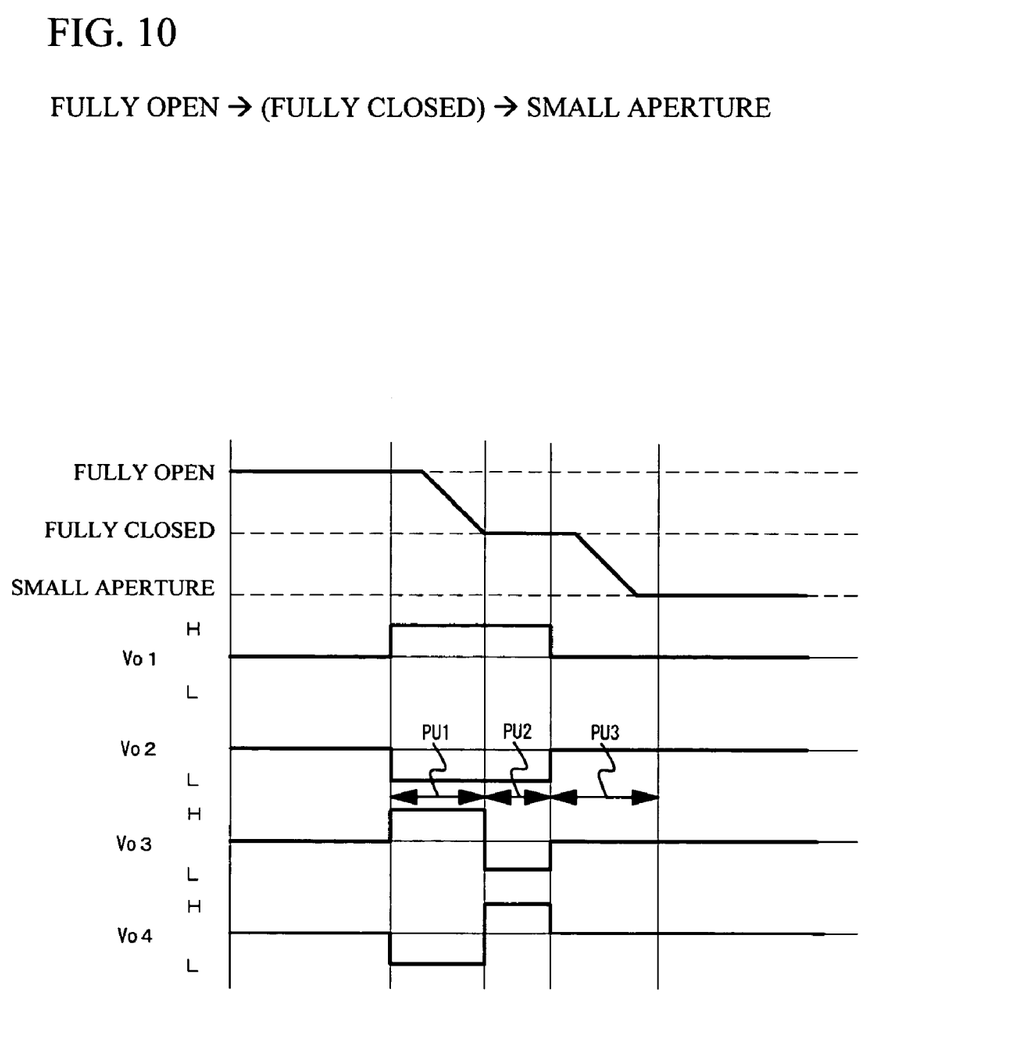
FIG. 10 shows a timing chart where the state is changed from the fully open state to the fully closed state, and the state is changed to the small aperture state in the end.
Figure 11:
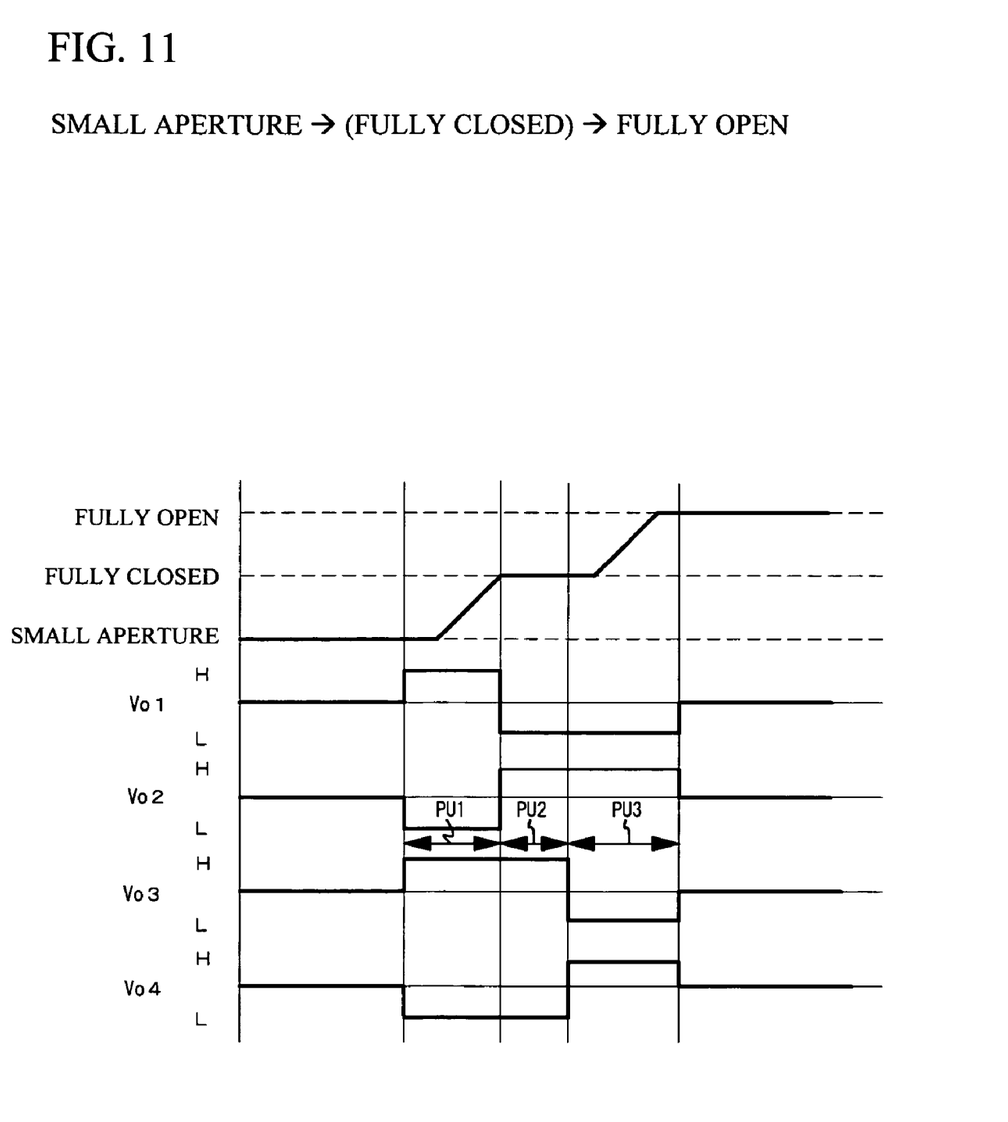
FIG. 11 shows a timing chart where the state is changed from the small aperture state to the fully closed state, and the state is changed to the fully open state in the end.

FIG. 8 through FIG. 11 show timing charts when the sector is moved by the sector drive mechanism. FIG. 8 shows a timing chart where the state is changed to the fully closed state from the fully open state and then that state is changed back to the fully open state again. FIG. 9 shows a timing chart where the state is changed to the fully closed state from the small aperture state and then that state is changed back to the small aperture state again. FIG. 10 shows a timing chart where the state is changed from the fully open state to the fully closed state, and the state is changed to the small aperture state in the end. FIG. 11 shows a timing chart where the state is changed from the small aperture state to the fully closed state, and the state is changed to the fully open state in the end.

In FIG. 8, the upmost waveform shows open and close state of the sector. This waveform shows the state where the sector moves to the fully closed state from the fully open state, and moves to the fully open state from the fully closed state. Four waveforms of Vo1 through Vo4 are shown in the middle. These waveforms exemplify current waveforms, namely, drive pulse waveforms, controlled by the current control circuit 25. The current Vo1 is applied to the first coil 4 and Vo2 having a symmetrical waveform thereof is output. The current Vo3 is applied to the second coil 5 and Vo4 having a symmetrical waveform thereof is output.

In FIG. 8, when the state is changed to the fully closed state from the fully open state, a single drive pulse PU1 is respectively supplied to the coils 4 and 5 from the current control circuit 25, and the sector is fully closed in one step. Here, a brake pulse BPU is existent between the drive pulses supplied to the coil 4. This is provided for attenuating the overrun due to an inertial force (inertia), when the moving sector is stopped at the fully closed position. Accordingly, the drive pulse to be supplied to the coil 4 is substantially one drive pulse. In this manner, the sector drive mechanism is capable of moving the sector to the fully closed position in one step, thereby enabling the shutter opening to close quickly.

The upmost drive waveform of the sector shown in FIG. 8 shows a time lag TL after the drive pulse is supplied to the coils 4 and 5 until the sector moves to the fully closed position. This time lag denotes a time while the sector positioned on a receded position moves to the position that shields the shutter opening.

When the sector achieves the fully closed state, the detent torque retains the position of the rotor 2 in the electromagnetic actuator 1 as described, even if no current is flowing across the coil 4 or 5 (non-magnetized state). In other words, the state is changed to the fully open state from the fully closed state, by means of an α route shown in FIG. 7A through FIG. 7E. Accordingly, as shown in FIG. 8, a PU2 is supplied to the coils 4 and 5 from the current control circuit 25 to achieve the dynamically stable stopped state A, and a PU3 is further supplied to achieve the fully open state. In this case, the sector can be changed back to the fully open state from the fully closed state through the dynamically stable stopped state A.

Here, a pulse HPU existent before the first drive pulse PU2 is a holding pulse. This pulse is so supplied to align the position of the rotor 2 to a given position. Therefore, PU2 and PU3 are substantial drive pulses that change the state to the fully open state from the fully closed state. The brake pulse BPU and the holding pulse HPU can be omitted. Also, the lowermost waveform in FIG. 8 shows a drive waveform of a CCD for image capturing housed in the camera. The CCD captures an image immediately before the shutter opening is closed, after the coil 4 or 5 was driven and a given period of time passed. Then, an image signal is sent to a given portion during a pulse TPU that is added to the end.

As described heretofore, when the sector drive mechanism is housed in a camera, the sector drive mechanism is capable of driving in one step in order to change the state to the fully closed state that requires the shutter speed. Therefore, the sector drive mechanism enables to capture a highly accurate image.

FIG. 9 through FIG. 11 show the timing charts as shown in FIG. 8. In the timing chart shown in FIG. 9, the state is changed to the fully closed state from the small aperture state in one step, and the state is changed back to the small aperture state in two steps, as shown in FIG. 8. With respect to the drive pulse in FIG. 9, Vo1 and Vo2, and Vo3 and Vo4 shown in FIG. 8 are respectively switched. The operation shown in FIG. 9 corresponds to a β route shown in FIG. 7A through FIG. 7E.

FIG. 8 and FIG. 9 show the operation where the state is changed to the fully closed state from the fully open state or the small aperture state, and the state is changed back to the initial state again. FIG. 10 shows the operation where the state is changed from the fully open state to the fully closed state, and the state is further changed to the small aperture state in the end. FIG. 11 shows the operation where the state is changed from the small aperture state to the fully closed state, and the state is further changed to the fully open state in the end. In both drawings, the fully closed state is achieved in one step of the drive pulse PU1, and subsequently, the fully open state or the small aperture state is achieved in two steps. FIG. 10 shows the timing chart when the state is changed to the small aperture state from the fully open state, and FIG. 11 shows the timing chart when the state is changed to the fully open state from the small aperture state. Hence, the fully closed position is a pass point. Even if the sector moves too much on the fully closed position, which does not cause the problem and there is no need for supplying the brake pulse BPU or the holding pulse HPU shown in FIG. 8 and FIG. 9.

As described heretofore, in the sector drive mechanism that employs the electromagnetic actuator 1, the sector is driven in one step in order to achieve the fully closed state in all the states shown in FIG. 8 through FIG. 11. The sector is driven in multiple steps when the state is changed to the fully open state or the small aperture state from the fully closed state, and the dynamically stable stopped state that regulates the rotational direction is included therein, and the sector can be moved certainly to the fully open position or the small aperture position. In addition, with the electromagnetic actuator 1 shown in FIG. 1, the rotor can be retained on a given position even if the current is not applied. Therefore, it is possible to provide the mechanism that can promote the power saving. In the above description, the sector drive mechanism is exemplarily described to include two shutter blades and one aperture blade to be drive by the electromagnetic actuator, yet the present invention is not limited to the embodiment described above. The number of the shutter blades and that of the aperture blades may be changed as necessary.

The present invention is not limited to the above-mentioned embodiment, and other embodiments, variations and modifications may be made without departing from the scope of the present invention.

What is claimed is:

1. A sector drive mechanism comprising:
   an electromagnetic actuator that includes a rotor having four polarities, a C-shaped stator, and a current control portion that controls current applied to a first coil and a second coil, the C-shaped stator including a first magnetic pole magnetically excited by the first coil, a second magnetic pole magnetically excited by the second coil, and a third magnetic pole magnetically excited by the first coil and the second coil; and
   sectors that are connected to the electromagnetic actuator to open and close a shutter opening provided in a substrate,
   wherein the first coil and the second coil are driven to close the shutter opening with a fewer number of pulses applied from the current control portion than the number of the pulses to open the shutter opening.

2. The sector drive mechanism as claimed in claim 1, further comprising a movement regulation member that regulates the sectors to given positions in a state where the shutter opening is opened,
   wherein a magnetic pole of the rotor is misaligned from a position that faces the magnetic pole of the stator in the state where the shutter opening is opened.

3. The sector drive mechanism as claimed in claim 1, wherein the state where the shutter opening is opened includes a fully open state where all the sectors having at least one shutter blade and at least one aperture blade open the shutter opening, and a small aperture state where said at least one aperture blade comes to the position of the shutter opening.

4. The sector drive mechanism as claimed in claim 1, wherein the current control portion supplies a single drive pulse to close the shutter opening, and supplies multiple drive pulses to open the shutter opening.

5. The sector drive mechanism as claimed in claim 4, wherein said multiple drive pulses supplied from the current control portion to open the shutter opening include a direction control pulse that determines a rotational direction of the rotor.

6. The sector drive mechanism as claimed in claim 4, wherein the current control portion includes a brake pulse in the single drive pulse to close the shutter opening.

7. The sector drive mechanism as claimed in claim 4, wherein the current control portion includes a holding pulse before the multiple drive pulses to open the shutter opening.

* * * * *